United States Patent
Cicala

(10) Patent No.: US 8,832,825 B2
(45) Date of Patent: Sep. 9, 2014

(54) CHALLENGE-RESPONSE METHODOLOGY FOR SECURING VEHICLE DIAGNOSTIC SERVICES

(71) Applicant: GM Global Technology Operations LLC, Detroit, MI (US)

(72) Inventor: John J. Cicala, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/688,355

(22) Filed: Nov. 29, 2012

(65) Prior Publication Data

US 2014/0150090 A1    May 29, 2014

(51) Int. Cl.
*G06F 21/00* (2013.01)
*G06F 21/44* (2013.01)

(52) U.S. Cl.
CPC ...................................... *G06F 21/44* (2013.01)
USPC ............... 726/19; 726/28; 711/154; 711/163; 713/154; 713/168; 713/182; 713/189

(58) Field of Classification Search
USPC ........... 726/2, 19, 28; 711/154, 163; 713/154, 713/168, 182, 189; 701/32, 33.2, 29.1, 701/33.4, 49
See application file for complete search history.

(56) References Cited

U.S. PATENT DOCUMENTS

| | | | |
|---|---|---|---|
| 2004/0073791 A1* | 4/2004 | Vollmer et al. | 713/168 |
| 2009/0119657 A1* | 5/2009 | Link, II | 717/171 |
| 2011/0224870 A1* | 9/2011 | Tan | 701/36 |
| 2012/0330498 A1* | 12/2012 | Nagara et al. | 701/33.2 |

* cited by examiner

*Primary Examiner* — Pramila Parthasarathy
*Assistant Examiner* — Hee Song
(74) *Attorney, Agent, or Firm* — Quinn Law Group, PLLC

(57) ABSTRACT

A method for locally authenticating a vehicle diagnostic tool with a vehicle using a challenge-response authentication scheme includes: receiving a pairing request from the vehicle diagnostic tool; presenting a user with a challenge through at least one of an audio system and an LCD display associated with the vehicle; receiving a response to the challenge from a user; and authenticating the vehicle diagnostic tool if the response from the user is identical to an expected response.

16 Claims, 1 Drawing Sheet

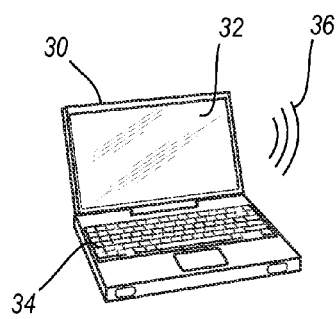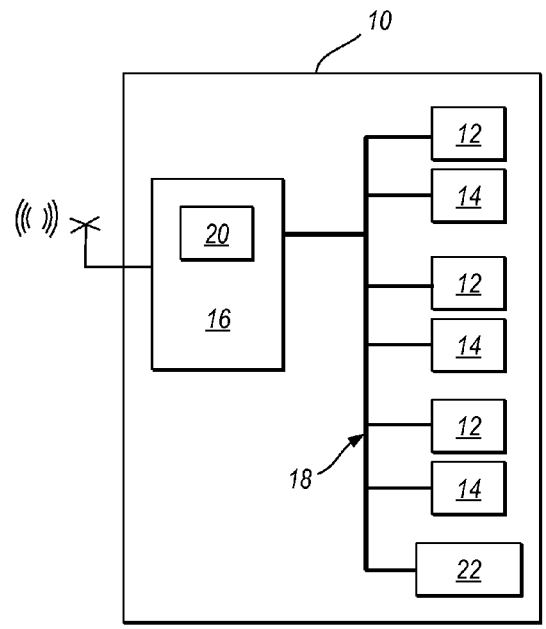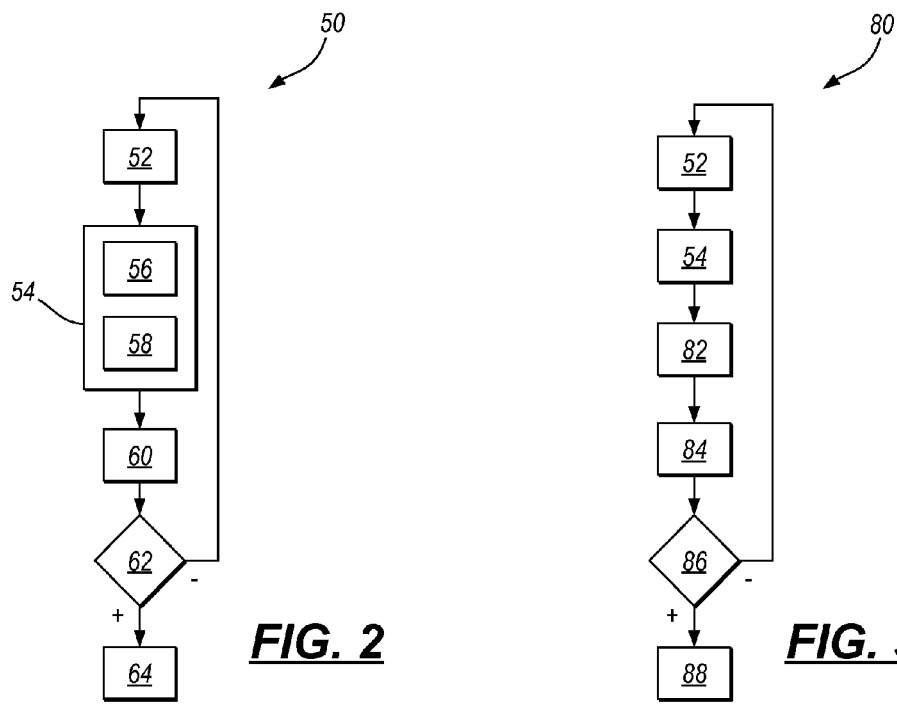
FIG. 1
FIG. 2
FIG. 3

CHALLENGE-RESPONSE METHODOLOGY FOR SECURING VEHICLE DIAGNOSTIC SERVICES

TECHNICAL FIELD

The present invention relates generally to a methodology for securing electronic vehicle diagnostics using a computer challenge and required human response.

BACKGROUND

Vehicle On-Board Diagnostics (OBD) provide a means for a vehicle to self-diagnose and/or report unexpected system behavior prior to a complete system failure. OBD systems give the vehicle owner or a repair technician access to state of health information for various vehicle sub-systems. OBD systems typically use a standardized digital communications port within the vehicle to provide real-time data in addition to a standardized series of diagnostic trouble/fault codes. However many repair procedures require Diagnostic services to be initiated from a remote diagnostic tool. Newer systems have been proposed that allow diagnostic tools to communicate with the vehicle through wireless communication protocols rather than through the standardized port.

SUMMARY

A method for locally authenticating a vehicle diagnostic tool with a vehicle using a challenge-response authentication scheme includes: receiving a pairing request from the vehicle diagnostic tool; presenting a user with a challenge through at least one of an audio system and an LCD display associated with the vehicle; receiving a response to the challenge from a user; and authenticating the vehicle diagnostic tool if the response from the user is identical to an expected response. Authenticating the vehicle diagnostic tool may include granting the vehicle diagnostic tool write-access to a communication bus of the vehicle, or allowing the vehicle diagnostic tool to read otherwise private information.

In one configuration, the challenge may include an alphanumeric code, and presenting the user with the challenge may include displaying the alphanumeric code to the user through an LCD display. Receiving a response to the challenge may then include receiving a representation of an entered alphanumeric code from the vehicle diagnostic tool. The alphanumeric code may be either a randomly generated number or a specific value found within the car. For example, the alphanumeric code may be an odometer reading, a trip meter reading, an average fuel economy reading, or an active radio station.

In another configuration, the challenge may include a requested local action, and receiving a response to the challenge may include receiving a sequence of user actions within the vehicle.

A system incorporating the present technology may include a vehicle diagnostic tool including a display and an input device, and a vehicle in wireless communication with the vehicle diagnostic tool. The vehicle may include a plurality of vehicle control systems, an LCD display, and a master controller in networked communication with each of the plurality of vehicle control systems over a communication bus.

The master controller may be configured to: receive a pairing request from the vehicle diagnostic tool; present a user with a challenge through the LCD display in response to the pairing request; receive a response to the challenge from a user; and authenticate the vehicle diagnostic tool if the response from the user is identical to an expected response.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of a system including a vehicle diagnostic tool in wireless communication with a vehicle.

FIG. 2 is a flow diagram of a method for locally authenticating a vehicle diagnostic tool with a controller of a vehicle.

FIG. 3 is a flow diagram of a method for locally authenticating a vehicle diagnostic tool with a controller of a vehicle.

DETAILED DESCRIPTION

Referring to the drawings, wherein like reference numerals are used to identify like or identical components in the various views, FIG. 1 schematically illustrates a vehicle 10, such as an automobile, that includes a plurality of vehicle control systems 12, and a plurality of vehicle diagnostic systems 14.

As used herein, a vehicle control system 12 may include an actuator that is configured to receive an electronic command, and perform a control action in response. Examples of control actions may include locking or unlocking one or more vehicle doors, illuminating one or more vehicle lights, manipulating the posture of a power vehicle seat, establishing/maintaining an engine spark timing, actuating an intake airflow throttle, etc.

Likewise, as used herein, a vehicle diagnostic system 14 may include one or more sensors that are configured to monitor a behavior of the vehicle, environment, or vehicle control system and provide a signal corresponding to the monitored parameter. For example, the plurality of vehicle diagnostic systems 14 may monitor the speed of the vehicle, rotation speed of the crankshaft, intake air temperature, occupant presence, and/or seatbelt engagement. Similarly, the vehicle diagnostic systems 14 may generate one or more fault codes if a system is not performing as expected.

Each vehicle control system 12 and vehicle diagnostic system 14 may be in networked communication with a master controller 16 over an addressed, vehicle communication bus 18. The master controller 16 may supervise communications over the bus 18, and may aid in providing directions to the plurality of vehicle control systems 12. The master controller 16 may be embodied as one or more digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. The master controller 16 may be configured to automatically perform one or more control/processing routines that may be embodied as software or firmware, and may either be stored locally on the controller 16, or may be readily assessable by the controller 16. In one configuration, the master controller 16 may be included with, for example, the engine control unit (ECU) of a typical vehicle 10.

The master controller 16 may include one or more diagnostic registers or logs 20, which may store real-time diagnostic information from the diagnostic systems 14 and/or any generated fault codes. Additionally, the master controller 16 may be in communication with one or more digital display devices 22, such as an LCD display, that may communicate one or more pieces of diagnostic information to a vehicle occupant, from the one or more diagnostic registers or logs 20. For example, the digital display device 22 may be included with an instrument panel of the vehicle 10, and may display vehicle odometer information, oil life information, and/or fuel economy information. Similarly, another display device 22 may be included with a radio or navigation system, and may be configured to display a radio station frequency or real-time vehicle GPS coordinates.

The communications bus 18 between the master controller 16 and the various vehicle systems 12, 14, 22, may be implemented using any suitable serial bus protocol, such as, for example, Controller Area Network (CAN), CAN 2.0, and/or Ethernet. In one configuration, the communications bus 18 may conform to the standards for an On-Board Diagnostic system (e.g., using OBD and/or OBD-II protocols), such as for example, those standards identified in ISO 9141, ISO 11898, ISO 14230, ISO 15031, and/or ISO 15765.

To aid in diagnosing unexpected behavior of the vehicle or vehicle systems, a technician may use a vehicle diagnostic tool 30 to review fault codes and/or selectively interface with the vehicle control systems 12. While shown as a laptop-style computer in FIG. 1, the vehicle diagnostic tool 30 may similarly be a hand-held device. The diagnostic tool 30 may include both a visual display 32, such as an LCD display, and a human input device 34, such as a keyboard. The diagnostic tool 30 may be a computerized device, and may include one or more processors, as well as memory, communication circuitry, and/or operating software/firmware.

The diagnostic tool 30 may interface with the master controller 16 and communications bus 18 through a bi-directional wireless communications link 36 that may be supported by one or more antenna and/or digital transceivers. This communications link may be a secure link that uses a known security protocol, such as, for example, WPA, WPA2, or WEP. Using this link 36, the tool 30 may wirelessly communicate with the master controller 16 (via antennae disposed on the vehicle) to interface with modules or systems on the communications bus 18.

Upon gaining read-access to the bus 18, the diagnostic tool may read the one or more diagnostic registers or logs 20 stored on the master controller 16, and display the logged diagnostic data to a user of the tool through the display device 32. If the diagnostic tool 30 is granted write-access to the communication bus 18, it may transmit control signals and/or operational instructions to the vehicle control systems 12. Such instructions may be initiated by the user of the tool via the interface device 34, and may ultimately instruct a respective control system 12 to perform some action. In one configuration, read-access may be granted upon establishing a wireless communication connection between the tool 30 and vehicle 10.

The tool's ability to transmit and receive data/instructions with the communications bus 18 may provide a technician or other user of the tool with the ability to troubleshoot and/or diagnose one or more vehicle systems that are performing in an unexpected manner. For example, if a power window is non-responsive, the tool 30 may provide an instruction to the window controller to raise or lower the window. If the window controller responds by raising/lowering the window, the technician may infer that the window switch is faulty. Conversely, if the window controller remains non-responsive despite the direct command, the technician may infer that the problem lies with the actuator motor or window controller, rather than the switch.

While an unfettered ability to interface with the communications bus 18 is valuable for a technician attempting to diagnose/troubleshoot unexpected vehicle behavior, it also presents a security threat to the integrity of the various electronic systems. Moreover, as vehicles and interface tools become increasingly connected to the internet, precautions may be taken to restrict access to important vehicle data and vehicle control systems. These precautions should be particularly suited to allow access to individuals who are local to the vehicle, and deny access to individuals that are entirely remote from the vehicle, or who do not have access permission from a local user.

Therefore, in one configuration, prior to gaining write-access to the vehicle communication bus 18, the vehicle diagnostic tool 30 may be required to locally authenticate itself with the vehicle 10. As will be discussed in greater detail below, this local authentication may include a challenge-response authentication scheme that requires some physical interaction directly with the vehicle 10 before access to the bus 18 may be granted.

In one configuration, the local authentication may be required before gaining write-access to the bus 18. Likewise, local authentication may also be required before gaining read-access to certain sensitive personal or sensitive vehicle information (e.g., personal identity information, GPS information, etc). Other generic read-only diagnostic information may be made available without local authentication.

FIG. 2 schematically illustrates an embodiment of a method 50 for locally authenticating a vehicle diagnostic tool 30. The method 50 begins at step 52 when the diagnostic tool 30 makes an initial pairing request to the vehicle 10. Step 52 may be performed wirelessly between the tool 30 and the vehicle 10, and may occur after a technician identifies the desired target vehicle from a list displayed on the display device 32. In one configuration, the target vehicle may be identified through a unique identification number, such as a MAC address, a VIN number, a phone number, or some other unique identifier.

Once the vehicle 10 and/or master controller 16 receives the pairing request from the diagnostic tool 30, in step 54, the controller 30 may prompt the user with a local challenge, such as through an audio request, or by communicating the challenge via a display device 22 of the vehicle 10 (e.g., a display on the instrument panel or navigation/radio display). The local challenge may either request a unique local action, such as depressing a particular sequence or combination of buttons within the vehicle 10, or may provide a particular alphanumeric code for re-entry into the diagnostic tool 30.

In the instance where the challenge includes an alphanumeric code, the code may be randomly generated by the master controller 16 and displayed using one of the various display devices within the vehicle. Alternatively, the alphanumeric code may be a unique number that would only be known to an individual located within the vehicle. Such unique numbers may include, for example and without limitation, the odometer reading, the trip meter reading, an average fuel economy reading, or an active radio station frequency.

The step of prompting the user with the challenge (step 54) may include both displaying the challenge (e.g., alphanumeric code) 56, and storing the code in a memory register 58. Once the challenge is made by the vehicle 10, the diagnostic tool 30 may be placed in a response mode in step 58 to then receive an input corresponding to the challenge (via the input device 34). Upon receiving an entered code from the user of the diagnostic tool 30, the tool may transmit the entered code to the vehicle 10 in step 60.

To locally authenticate the tool, in step 62, the controller 16 may then compare the received code to the displayed code that was stored in memory. If the alphanumeric codes are identical, the controller 16 may grant the tool 30 an increased security level in step 64, which may permit the tool to write instructions to the communication bus 18. If, however, the alphanumeric codes are not identical, any increased security level may be denied, and/or reduced (i.e., read access may be revoked).

To further protect against unauthorized access, the controller 16 may secure the challenge generation/display at the higher security level (i.e., so that the tool may not merely read the register containing the access key). Likewise, the controller 16 may require address authentication or hardware encryption keys from the device that is attempting to gain access by transmitting an entered code. In this manner, only access attempts that are made by an authorized physical device may be granted access, all other requests may be disregarded.

FIG. 3 schematically illustrates a method 80 where the challenge includes a requested local action from a user (e.g., a sequence of button presses). This method may begin similar to method 50 in FIG. 2, however, once the user is prompted by the challenge in step 54, the controller 16 may then monitor the communication bus 18 for a sequence of user actions corresponding to the requested action in step 82. For example, if the challenge is "press Radio Button 2; press Radio Button 4; toggle Driver's Window Down," the controller 16 may monitor the communication bus 18 for signals corresponding to an actuation of buttons #2 and #4 on the radio, and a downward actuation of the window switch toggle. If a sequence of discrete actions is received, in step 84, the controller 16 may compare the received action sequence with the requested action sequence in step 86. If the sequences match, the controller 16 may grant the tool 30 an increased security level in step 88. Otherwise, the security level may remain the same or be downgraded.

Furthermore, when discrete action is requested, the controller may require address authentication from the device generating the command. In this manner, the controller 16 may disregard any action command that originates from a source other than the expected piece of hardware (i.e., a diagnostic tool with back-door access on the communication bus 18 could not simulate the required sequence of button-presses.

In both the method 50 illustrated in FIG. 2 and the method 80 illustrated in FIG. 3, when the tool 30 is given write access, such a write-access message may be broadcast across the communication bus 18. When this occurs, each module/system may know that only the master controller 16 is responsible for altering the security level. If a security modification should come from any other source on the bus 18, it may be disregarded. Such authentication of the origin of the write-access grant may occur through, for example, address authentication, or other means of hardware and/or software encryption.

The methods of local authentication described above may only require that there be some local presence near the vehicle in cooperation with the requestor. They do not preclude the requestor from being located at a remote internet location. The present security methodology may aid in ensuring that the vehicle is supervised during remote diagnostic testing, and that the local presence is aware and consents to the testing.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method for locally authenticating a vehicle diagnostic tool with a vehicle using a challenge-response authentication scheme, the method comprising:
   receiving a pairing request from the vehicle diagnostic tool;
   presenting a user with a challenge through at least one of an audio system and an LCD display associated with the vehicle, wherein the challenge includes at least one of an alphanumeric code displayed to the user through the LCD display and a requested local action, wherein the requested local action includes a requested actuation of at least one of a button and a toggle switch of the vehicle;
   receiving a response to the challenge from the user, wherein the response includes at least one of a representation of an entered alphanumeric code from the vehicle diagnostic tool and a sequence of user actions within the vehicle, wherein the sequence of user actions includes an actuation of the at least one of the button and the toggle switch of the vehicle; and
   authenticating the vehicle diagnostic tool if the response from the user is identical to an expected response.

2. The method of claim 1, wherein the alphanumeric code is a randomly generated number.

3. The method of claim 1, wherein the alphanumeric code includes an odometer reading, a trip meter reading, an average fuel economy reading, or an active radio station.

4. The method of claim 1, wherein authenticating the vehicle diagnostic tool includes granting the vehicle diagnostic tool write-access to a communication bus of the vehicle.

5. The method of claim 4, wherein granting the vehicle diagnostic tool write-access to a communication bus of the vehicle includes broadcasting a write-access message on the communication bus;
   the method further comprising authenticating the write-access message to a master controller on the communication bus.

6. A system comprising:
   a vehicle diagnostic tool including a display and an input device;
   a vehicle in wireless communication with the vehicle diagnostic tool, the vehicle including:
       a plurality of vehicle control systems;
       an LCD display;
       a master controller in networked communication with each of the plurality of vehicle control systems over a communication bus;
       wherein the master controller is configured to:
           receive a pairing request from the vehicle diagnostic tool;
           present a user with a challenge through the LCD display in response to the pairing request, wherein the challenge includes at least one of an alphanumeric code displayed to the user through the LCD display and a requested local action, wherein the requested local action includes a requested actuation of at least one of a button and a toggle switch of the vehicle;

receive a response to the challenge from the user, wherein the response includes at least one of a representation of an entered alphanumeric code from the vehicle diagnostic tool and a sequence of user actions within the vehicle, wherein the sequence of user actions includes an actuation of the at least one of the button and the toggle switch of the vehicle; and authenticate the vehicle diagnostic tool if the response from the user is identical to an expected response.

7. The system of claim 6, wherein the representation of the alphanumeric code is generated by the vehicle diagnostic tool in response to an alphanumeric entry by the user to the input device.

8. The system of claim 6, wherein the alphanumeric code is a randomly generated number.

9. The system of claim 6, wherein the alphanumeric code includes an odometer reading, a trip meter reading, an average fuel economy reading, or an active radio station.

10. The system of claim 6, wherein the master controller is configured to authenticate the vehicle diagnostic tool by granting the vehicle diagnostic tool write-access to the communication bus of the vehicle.

11. The system of claim 10, wherein the master controller is configured to grant the vehicle diagnostic tool write-access to a communication bus of the vehicle by broadcasting a write-access message on the communication bus; and the plurality of vehicle control systems are configured to authenticate the write-access message to the master controller.

12. A system for locally authenticating a vehicle diagnostic tool with a vehicle using a challenge-response authentication scheme, the system, comprising:

a non-transitory computer readable medium containing program instructions for causing a processor to perform the method of:

receiving a pairing request from the vehicle diagnostic tool;

presenting a user with a challenge through at least one of an audio system and an LCD display associated with the vehicle, wherein the challenge includes at least one of an alphanumeric code displayed to the user through the LCD display and a requested local action, wherein the requested local action includes a requested actuation of at least one of a button and a toggle switch of the vehicle;

receiving a response to the challenge from a user via an input device of the vehicle diagnostic tool, wherein the response includes at least one of a representation of an entered alphanumeric code from the vehicle diagnostic tool and a sequence of user actions within the vehicle, wherein the sequence of user actions includes an actuation of the at least one of the button and the toggle switch of the vehicle; and authenticating the vehicle diagnostic tool if the response from the user is identical to an expected alphanumeric response.

13. The system of claim 12, wherein the alphanumeric challenge includes a randomly generated number.

14. The system of claim 12, wherein the alphanumeric challenge includes an odometer reading, a trip meter reading, an average fuel economy reading, or an active radio station.

15. The system of claim 12, wherein authenticating the vehicle diagnostic tool includes granting the vehicle diagnostic tool write-access to a communication bus of the vehicle.

16. The system of claim 15, wherein granting the vehicle diagnostic tool write-access to a communication bus of the vehicle includes broadcasting a write-access message on the communication bus;

the method further comprising authenticating the write-access message to a master controller on the communication bus.

* * * * *